8609X
T. & S. Burgess.
Making Hoops.
Patented Jan. 21, 1835
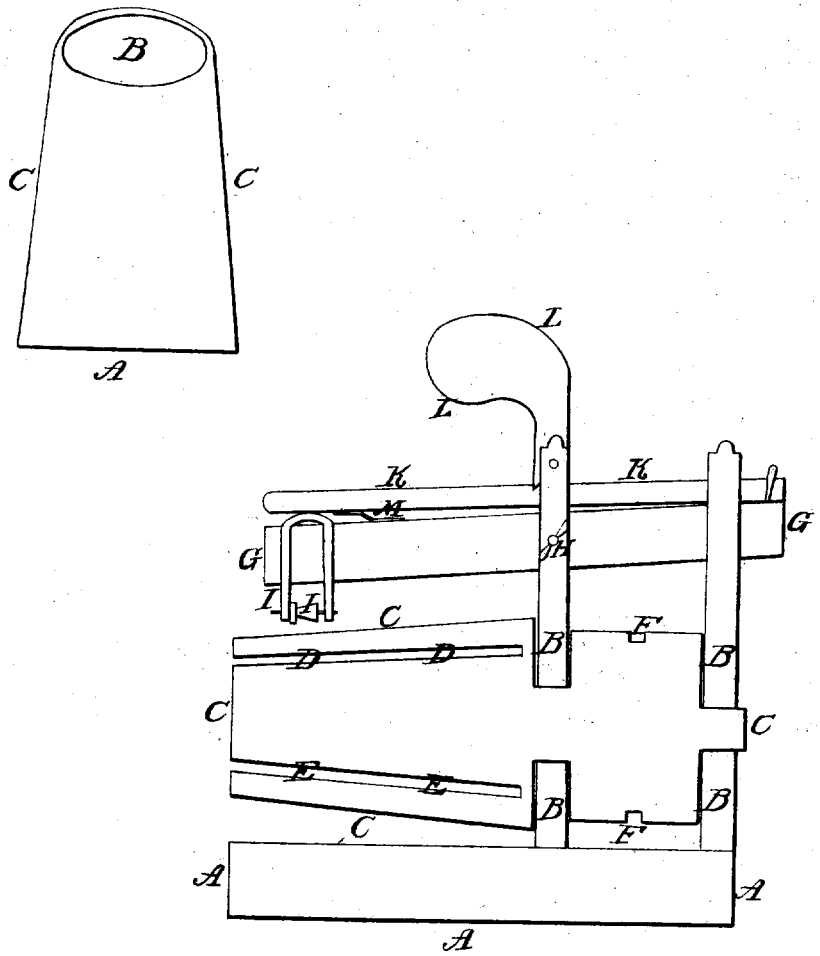
AM. PHOTO-LITHO. CO. N.Y. (OSBORNE'S PROCESS)

6-21-1835

8609X Jan. 21. 1835 325

Tristram Burgess & Simeon Burgess, of Livonia N.Y.
Letters Patent

The schedule referred to in these Letters Patent, and making part of the same, containing a description in the words of the said Tristram Burgess & Simeon Burgess themselves, of their improvement in making Truss Hoops.

---

To all to whom these presents shall come: Be it known, that we, Tristram Burgess & Simeon Burgess, of the Town of Livonia, County of Livingston & State of New-York, have invented a new & useful improvement in making Truss hoops, and that the following is a full & exact description of the construction & operation of said machine, as invented by us, to wit—

Fig 1st A. the base on which the machine stands; B, two perpendicular post that support the Cilinder. C. the cilinder on which the hoops are drawn by lever power the inside lap or first end of the hoop is made fast in the cilinder either with a key, box or screw, or some more sure & convenient way. D. the channel or grove to fasten the first end of the hoop in. E, the channel or grove to receive the gripe that holds or confines the hoop until riveted. F. the mortice in the cilinder between the two posts, to receive the lever to turn the cilinder; G. the slide passing through the post, gives the size of the hoop. H, the screw that confines the slide in its proper place. I, the roller, with a flange on one end to guide the hoop when rolling on to the cilinder. J. the stirrip within which the above described roller moves. K, the spring that presses the roler hard on the hoop. L. the balance key that confines the spring to its proper place. M. a small steel spring to raise the stirrip & roler off the hoop— Fig 2nd A. cilinder made of iron, brass or some suitable material made the same taper of the cilinder above described for the purpose of heating & rounding the hoops after riveting, to wit. A. the largest end of the cilinder. B. the smallest end of the cilinder. C. the conical or tapering sides of the cilinder. And further we call the two cilinders above described, with their various operations, our principle—

Witness our hands 22nd Decr 1834

Witnesses
M. B. Martin, Seman Gibbs.

Tristram Burgess
Simeon Burgess

[illegible]

(Drawing)